(12) United States Patent
Guiet

(10) Patent No.: US 6,745,849 B2
(45) Date of Patent: Jun. 8, 2004

(54) TOWED IMPLEMENT

(75) Inventor: Lionel Guiet, Gray (FR)

(73) Assignee: Deere & Company, Moline, IL (US)

( * ) Notice: Subject to any disclaimer, the term of this patent is extended or adjusted under 35 U.S.C. 154(b) by 104 days.

(21) Appl. No.: 09/982,409

(22) Filed: Oct. 18, 2001

(65) Prior Publication Data

US 2002/0056556 A1 May 16, 2002

(30) Foreign Application Priority Data

Oct. 26, 2000 (DE) .......................................... 100 53 454

(51) Int. Cl.$^7$ ................................................ A01B 63/16
(52) U.S. Cl. ...................... 172/669; 172/507; 172/395
(58) Field of Search .............................. 172/669, 677, 172/678, 679, 680, 395, 439, 799.5, 507

(56) References Cited

U.S. PATENT DOCUMENTS

| | | | | |
|---|---|---|---|---|
| 3,035,393 A | | 5/1962 | Mathews | 56/505 |
| 3,623,304 A | * | 11/1971 | Molzahn | 56/208 |
| 4,423,788 A | * | 1/1984 | Robinson et al. | 172/427 |
| 4,923,014 A | * | 5/1990 | Mijnders | 172/2 |
| 5,234,060 A | * | 8/1993 | Carter | 172/413 |
| 6,382,326 B1 | * | 5/2002 | Goins et al. | 172/239 |

FOREIGN PATENT DOCUMENTS

| | | |
|---|---|---|
| DE | A1-31 39 936 | 4/1983 |
| EP | A1-0 149 870 | 7/1985 |

* cited by examiner

Primary Examiner—Thomas B. Will
Assistant Examiner—Alexandra K. Pechhold

(57) ABSTRACT

A towed, agricultural implement includes an undercarriage supported on ground wheels that are attached to the undercarriage by trailing support arms. An adjusting motor is coupled between the undercarriage and a transverse torsion rod having its opposite ends coupled to the wheel support arms by braces. The adjusting motor is selectively operable for raising and lowering the ground wheels relative to the undercarriage, with the torsion rod acting to absorb shocks between the undercarriage and the wheel support arms.

5 Claims, 2 Drawing Sheets

TOWED IMPLEMENT

FIELD OF THE INVENTION

The invention pertains to a suspension for the ground wheel or wheels of a towed implement.

BACKGROUND OF THE INVENTION

DE-A1-31 39 936 discloses a towed agricultural implement with an undercarriage, on two lateral end regions of which one respective wheel suspension is arranged. Both wheel suspensions include a shaft in the region of their pivoting axis, and these shafts are connected such that they can be moved relative to one another by a spring loaded, longitudinally extending, swinging arm, namely on the ends that face one another. An adjusting device can be engaged with limit stops on the wheel suspensions in one direction in order to adjust the wheel suspensions in one direction.

EP-A1-0 149 870 describes a towed mower in which an adjusting device and a spring member are connected in series. In one of the embodiments described in this publication, an adjusting cylinder acts upon a pivoted shaft that vertically pivots wheel cranks on the respective end regions by means of braces equipped with gas pressure springs.

The prior art suspension spring devices have the drawback of being relatively expensive to construct.

SUMMARY OF THE INVENTION

According to the present invention there is provided an improved implement wheel suspension spring arrangement.

An object of the invention is to provide an implement wheel suspension spring arrangement which is of a simple, inexpensive construction.

A more specific object of the invention is to provide an implement wheel suspension spring arrangement wherein the spring comprises a transverse rod in the form of a torsion spring having crank arms secured to opposite ends thereof and an adjusting device secured to its central portion, and a brace extending between each crank arms and a trailing, wheel support arm.

DESCRIPTION OF THE PREFERRED EMBODIMENTS

Figure 1:
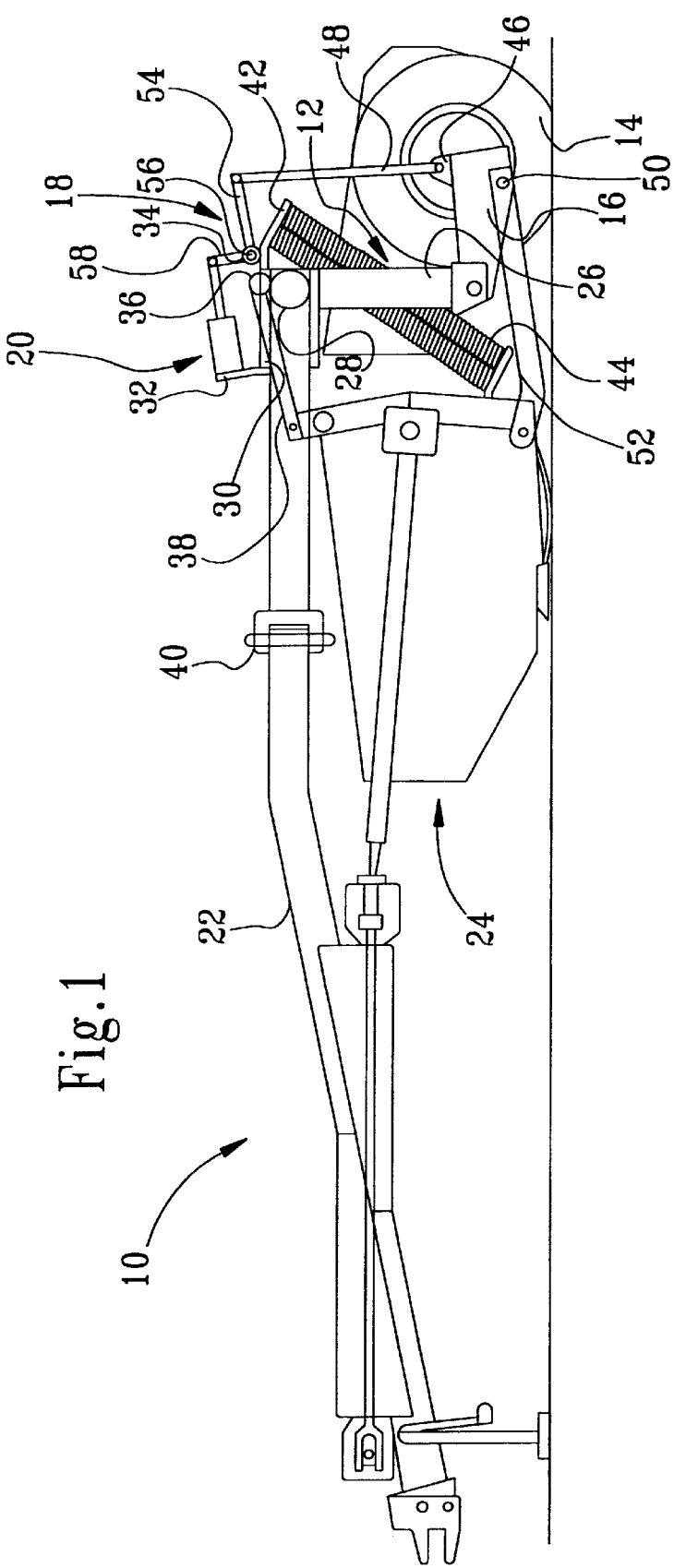
FIG. 1 is a schematic left side view of a towed implement.

Referring now to FIG.1, there is shown an implement 10 including an undercarriage 12, wheels 14, wheel suspension or support arms 16, a spring arrangement 18, an adjusting device 20, a hitch 22 and a working unit 24. The implement 10 is here illustrated in the form of a mower-conditioner that serves for cutting, processing, and depositing on the ground stalk crops. While in operation, the implement 10 is towed over uneven terrain with a relatively high speed and is constantly subjected to shocks that, in addition to the flexibility of the wheels 14, need to be absorbed by the spring member 18. However, the invention is by no means limited to an implement 10 of this type, but can also be used in other towed implements, e.g., balers, soil conditioning tools, saws, sprayers and the like.

The undercarriage 12 is in the form of a frame that has the shape of an upside-down "U" with vertical limbs 26 and a horizontal crossbeam 28, in the intermediate space of which the working unit 24 is at least partially accommodated. The undercarriage 12 carries the working unit 24 in a fashion described in greater detail below and can be adjusted, together with the working unit 24, to different elevations with reference to the ground. A wheel 14 is connected in the lower region of each limb 26 such that it can be vertically pivoted, namely by means of the wheel suspension or support arm 16, which are mounted to the associated limb in a trailing fashion. A carrier or mount 30 in the form of a plate with a holder 32 is arranged on the crossbeam 28 in the center between the limbs 26. Several bearings 34 are arranged in laterally spaced, substantially uniform distribution along the length of the rear side of the crossbeam 28. In any case, as can best be seen in FIG. 2, the bearings are situated within the region of the carrier 30 and the limbs 26. In addition, a bearing 36 for an upper longitudinally extending, pivotally mounted arm 38 is provided at a central location between the opposite ends of the beam 28, and joined in that location also is a fixed rear section of the hitch 22, this rear section having a forward end defined by a clevis which receives, and is coupled to, the rear end of a forward section of the hitch 22 by a vertical bearing arrangement 40 for establishing a connection permitting the front hitch section to pivot horizontally relative to the rear section. This front section of the hitch 22 is adapted for connection to a towing vehicle, e.g., a tractor. Receivers 42 for counterbalance springs 44 are also arranged on each side or end of the crossbeam 28. The wheels 14 are conventionally provided with pneumatic tires and are rotatably arranged on the free end of the wheel suspension or support arms 16. The undercarriage 12 is supported on the ground by the wheels 14.

Each wheel suspension or support arm 16 is in the form of a crank having its forward pivotally attached to a lower location of a respective one of the limbs 26. The wheel 14 is rotatably mounted on a spindle carried at a rear end location of the arm 16, and located at an upper rear location is a bracket 46 to which a lower end of a brace 48 is pivotally coupled. Located at a lower rear location of the arm 16 is a pivotal connection 50 which secures the rear end of a lower, longitudinally extending arm 52 to the arm 16. The brace 48 and an arm 54, which are connected together for pivoting about a transverse axis, also form part of the wheel suspension 16. The brace 48 may be constructed so as to be adjustable in length, but can simply be realized in the form of a metal rod with forked ends, or the like, for producing a connection on the arm 54 and wheel suspension arm 16.

Figure 2:
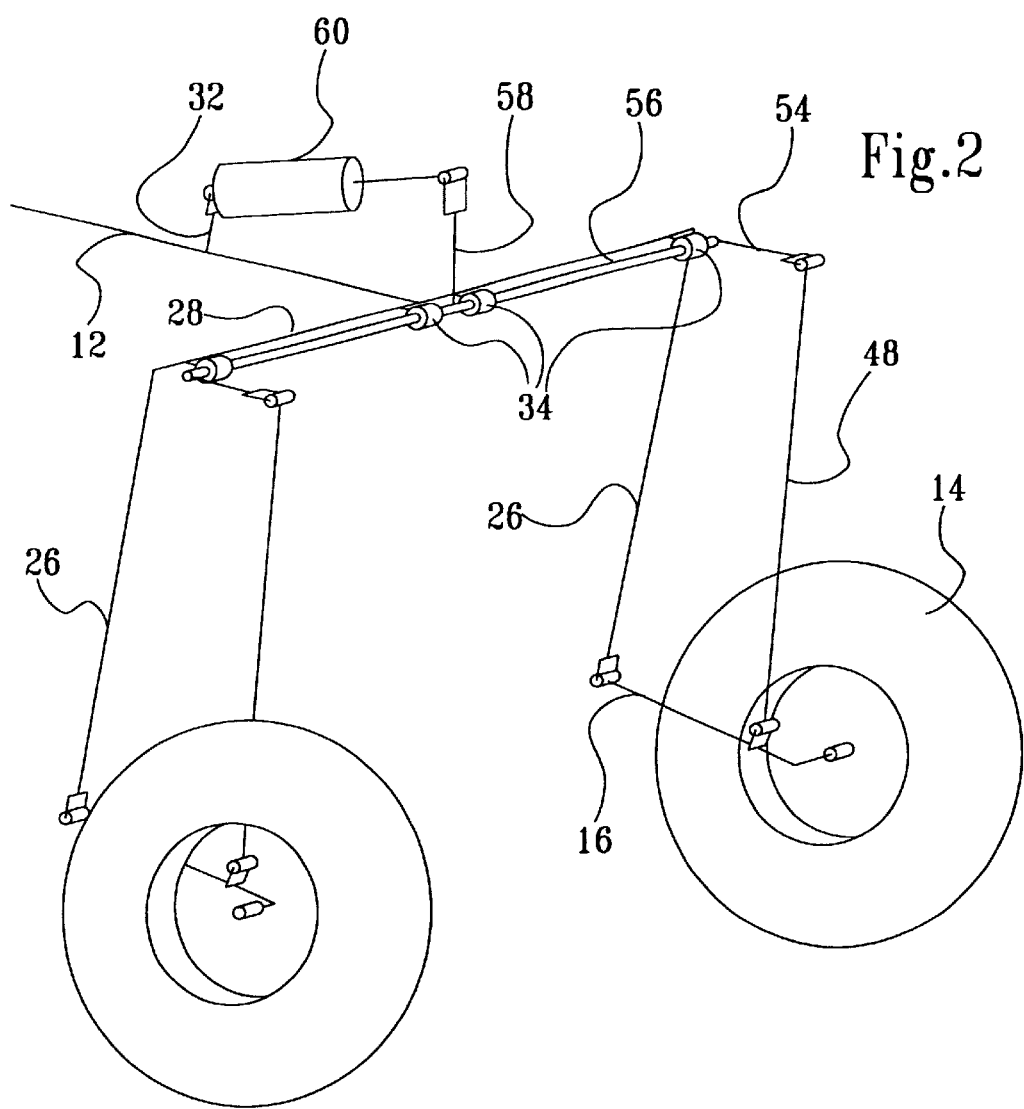
FIG. 2 is a schematic representation of the ground wheels of the towed implement and the wheel suspension spring arrangement.

Referring now also to FIG. 2, it can be seen that the spring member 18 includes a torsion spring element 56 that is realized in the form of a torsion shaft in the embodiment shown. The torsion spring element 56 essentially extends over the entire length of the crossbeam 28 and is rotatably accommodated in the bearings 34. One of the arms 54 radially and immovably engages on the torsion spring element 56 in each of its end regions. An adjusting arm 58 is also radially and rigidly engaged with the torsion spring element 56 in the center or in the region of the carrier 30. The arms 54 and the adjusting arm 58 are offset angularly offset relative to one another about the spring element 56 by approximately 90 degrees, in this embodiment. The position of the arms 54 and the adjusting arm 58 may, in principle, be freely selected as long as the desired function is fulfilled and predetermined dimensions are not exceeded. The torsion spring element 56 is realized, in this embodiment, in the form of a highly elastic steel shaft with a round cross section.

The adjusting device 20 includes a motor operator 60 that extends between the projecting end of the adjusting arm 58 and the holder 32. The motor operator 60 is realized in the form of a single-acting hydraulic motor that is pressurized in order to be extended. In addition to the spring member 18, it would also be conceivable to equip the motor operator 60 with a pneumatic or mechanical spring. The motor operator 60 is conventionally controlled by a not-shown towing vehicle in order to raise and lower the undercarriage 12.

The working unit 24 is in the form of a mower with a conditioning device, the working height of which can be adjusted by operation of the adjusting device 20. The working unit 24 is suspended on the undercarriage 12 by the upper arm 38 and the lower arms 52 and the counterbalance springs 44. For this purpose, corresponding fastening elements are provided which, however, are not described in greater detail because they are generally known.

According to the previous description, the arrangement is designed and functions as described below.

The undercarriage 12 is supported on the ground by the wheels 14, wherein an essentially rigid connection that includes the holder 32, the motor operator 60, the adjusting arm 58, the torsion spring element 56, the arms 54, the braces 48 and the wheel suspension or support arms 16 counteracts a downward movement of the undercarriage. Leaving aside the elasticity that is inherent to each component, a spring function is only performed in the respective region between the arms 54 and the adjusting arm 58 due to the turning of the torsion spring element 56. This means that the torsion spring element 56 more or less twists within itself when the wheels 14 move over a rock or similar uneven terrain. In instances in which the wheels 14 are able to yield downward, e.g., when moving over a depression, the torsion spring element 56 prevents an excessively high downward acceleration.

In one additional development of the invention, the degree of the elastic excursion can be varied by shortening or lengthening the effective lever arm of the arms 54 or the adjusting arm 58 or by shifting the point at which the brace 48 engages on the wheel suspension or arm 16.

Having described the preferred embodiment, it will become apparent that various modifications can be made without departing from the scope of the invention as defined in the accompanying claims.

What is claimed is:

1. In a towed implement including an undercarriage, at least one wheel suspension arm mounted to said undercarriage for vertical movement relative to said undercarriage and an adjusting device coupled between said undercarriage and the suspension arm for selectively raising and lowering the latter relative to the undercarriage, the improvement comprising: a torsion spring element coupled between said adjusting device and said wheel suspension arm for transferring movement of said adjusting device to said wheel suspension arm and for winding up within itself between said wheel suspension arm and said adjusting device in response to movement of said suspension arm when said adjusting device is fixed.

2. The towed implement as defined in claim 1 wherein said torsion spring element is defined by a torsion shaft.

3. The towed implement as defined in claim 1 wherein a wheel suspension arm is provided at each side of the implement; said torsion spring element being coupled to each wheel suspension arm; and said adjusting device being coupled to said torsion spring element at a central location between the wheel suspension arms.

4. The towed implement as defined in claim 2 wherein said torsion shaft is supported on said undercarriage by a plurality of transversely spaced bearings.

5. The towed implement as defined in claim 1 wherein said torsion spring element includes a torsion spring that works by rotating about an axis extending transverse to a normal direction of travel of the implement.

* * * * *